United States Patent
Hayashi (12)

(10) Patent No.: US 7,758,969 B2
(45) Date of Patent: Jul. 20, 2010

(54) PHOTOSENSITIVE COMPOSITION, OPTICAL ELEMENT USING THE SAME, AND METHOD FOR MANUFACTURING THE SAME

(75) Inventor: Shinji Hayashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 173 days.

(21) Appl. No.: 11/391,437

(22) Filed: Mar. 29, 2006

(65) Prior Publication Data

US 2007/0087135 A1    Apr. 19, 2007

(30) Foreign Application Priority Data

Mar. 30, 2005    (JP)    .............................. 2005-096645
Mar. 30, 2005    (JP)    .............................. 2005-096647
Mar. 30, 2005    (JP)    .............................. 2005-097797

(51) Int. Cl.
*B32B 27/00*    (2006.01)
*C09K 19/00*    (2006.01)
*G02F 1/13*    (2006.01)

(52) U.S. Cl. ......................... 428/500; 428/1.1; 349/193

(58) Field of Classification Search ....................... None
See application file for complete search history.

(56) References Cited

U.S. PATENT DOCUMENTS 7,070,838 B2 *    7/2006    Sasada et al. ................. 428/1.1

FOREIGN PATENT DOCUMENTS

JP    11-513019    11/1999

* cited by examiner

*Primary Examiner*—Sheeba Ahmed
(74) *Attorney, Agent, or Firm*—Manabu Kanesaka

(57) ABSTRACT

An optical element includes a supporting material, and a phase difference controlling functional layer provided on the supporting material and including a polymerized liquid crystal material cured to have a predetermined liquid crystal regularity. The phase difference controlling functional layer is formed by curing a photosensitive composition. The photosensitive composition includes at least a polymerizable liquid crystal material, a photopolymerization initiator, a crosslinking agent, an acid generator, and a solvent. The crosslinking agent is an alcohol having at least two alkylol groups thereon and undergoing electrophilic substitution onto an aromatic ring, or an alkoxy compound having at least two alkoxy groups thereon and undergoing electrophilic substitution onto an aromatic ring.

18 Claims, 1 Drawing Sheet

Fig. 1A
Fig. 1B
Fig. 1C
Fig. 1D
Fig. 1E
Fig. 1F
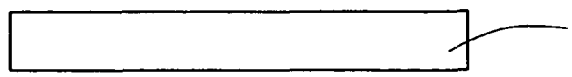
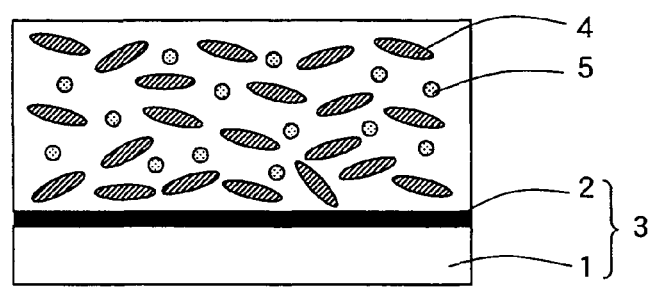
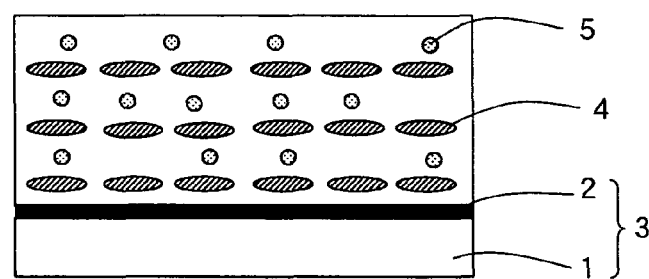
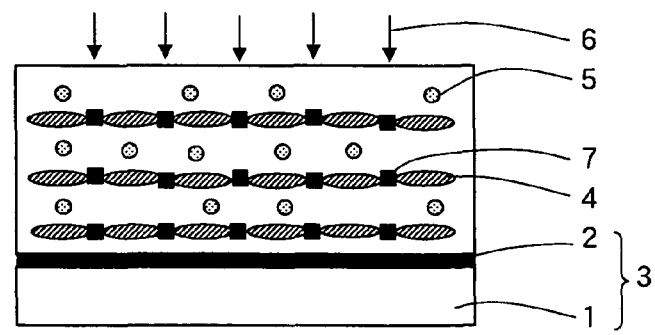
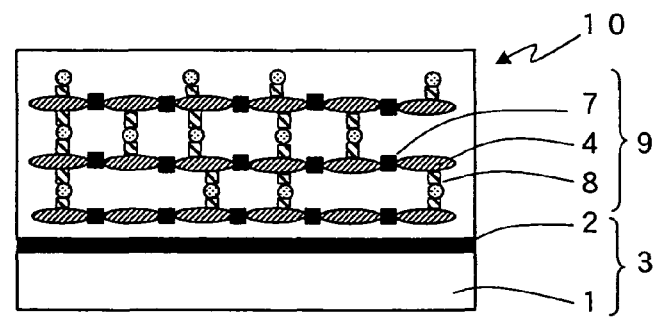

PHOTOSENSITIVE COMPOSITION, OPTICAL ELEMENT USING THE SAME, AND METHOD FOR MANUFACTURING THE SAME

BACKGROUND OF THE INVENTION

1. Field of the Invention

The present invention relates to a photosensitive composition for an optical element having stable optical properties used in a liquid crystal display, and an optical element using the photosensitive composition, and a method of manufacturing the optical element.

2. Description of the Related Art

Phase difference films are widely used as phase difference controlling functional layers in liquid crystal displays. For example, for a reflecting liquid crystal display, a linearly polarizing plate and a ¼λ phase difference plate are generally used together to obtain circularly polarized light. Moreover, in a vertical alignment mode LCD that has become widely used in liquid crystal TVs in recent years, to reduce the viewing angle dependence, a phase difference film having an optical axis perpendicular to the substrate and a negative birefringence anisotropy (a negative C plate) and a phase difference film having an optical axis parallel to the substrate and a positive birefringence anisotropy (a positive A plate) are used together.

In addition, many other phase difference films such as viewing angle compensating films using discotic liquid crystals have come onto the market. Such a phase difference film, in which another phase difference plate and a polarizing plate are bonded with the optical axes at a certain specific angle to one another, is used bonded to the outside of a liquid crystal cell. Here, an adhesive used in the bonding has a different refractive index to the phase difference plate and the polarizing plate, and hence reflection of external light occurs at the bonding interface. This reflection of external light causes a decrease in the display contrast, causing a marked deterioration in the image quality.

This problem can be resolved by forming a phase difference controlling functional layer inside the cell using a liquid crystal material instead of using a phase difference film as described above. That is, a phase difference controlling functional layer can be provided by using a liquid crystalline polymer that has a glass transition point and for which the liquid crystal structure can be frozen below this glass transition point, or a polymerizable liquid crystal that has reactive groups such as unsaturated bonds in the molecular structure thereof and for which the liquid crystal structure can similarly be frozen by crosslinking the unsaturated bonds together while in a liquid crystal layer state. As such polymerizable liquid crystal materials, various materials have been proposed, for example in Published Japanese Translation of PCT Application No. 11-513019.

However, conventionally, when forming a phase difference controlling functional layer inside a cell, in the case of providing a phase difference controlling functional layer between a glass substrate and a color filter layer using a polymerizable liquid crystal material, there has been a problem that the performance of the phase difference controlling functional layer deteriorates through a heating process in the color filter manufacture. Moreover, even in the case of providing the phase difference controlling functional layer on the color filter layer, there has been a problem of the phase difference controlling functional layer cracking through a subsequent electrode establishing process in which a transparent conductive ITO film is sputtered on.

In view of the above problems, it is an object of the present invention to provide a photosensitive composition for an optical element that has stable optical properties, i.e. for which the performance of a phase difference controlling functional layer does not decrease upon heating when manufacturing color filters used in an image display apparatus such as a liquid crystal display and, and cracking or the like does not occur upon ITO sputtering in an electrode establishing process, an optical element using the photosensitive composition, and a method of manufacturing the optical element.

The present inventors considered that causes of the above problems were the crosslink density of the phase difference controlling functional layer being low, and the distance between crosslinking sites being long due to the polymerizable liquid crystal molecules being crosslinked together at terminal groups thereof, and hence the molecular alignment in the phase difference controlling functional layer being disturbed upon heating, and as means for resolving the above problems, discovered that by applying a photosensitive composition containing at least a polymerizable liquid crystal material, a photopolymerization initiator, a crosslinking agent, and a solvent onto a supporting material, irradiating with ultraviolet radiation while aligned in a liquid crystal state so as to cure, and then carrying out heating treatment, so as to crosslink through the action of the crosslinking agent between the mesogenic backbones in the cured polymerizable liquid crystal material, the heat resistance and the ITO resistance of the phase difference controlling functional layer are improved.

SUMMARY OF THE INVENTION

The present invention relates to a photosensitive composition comprising at least a polymerizable liquid crystal material, a photopolymerization initiator, a crosslinking agent, and a solvent, wherein the crosslinking agent is selected from compounds having at least two alkylol groups therein and compounds having at least two alkoxy groups therein.

Moreover, the present invention relates to a photosensitive composition comprising at least a polymerizable liquid crystal material, a photopolymerization initiator, a crosslinking agent, and a solvent, wherein the crosslinking agent comprises a mixture of a compound having at least two alkylol groups therein and a compound having at least two alkoxy groups therein.

The photosensitive composition of the present invention includes one further containing an acid generator.

Moreover, the present invention relates to an optical element having a supporting material, and a phase difference controlling functional layer that is provided on the supporting material and comprises a polymerizable liquid crystal material cured having a predetermined liquid crystal regularity, wherein the phase difference controlling functional layer is formed using a photosensitive composition as described above.

The optical element of the present invention includes one in which the polymerizable liquid crystal material constituting the phase difference controlling functional layer is crosslinked between mesogenic backbones via the crosslinking agent and between terminal groups.

Moreover, the optical element of the present invention includes one in which the supporting material is a transparent substrate having an alignment film thereon.

Furthermore, the optical element of the present invention includes one in which the supporting material is a color filter substrate having an alignment film thereon, and includes one in which a protective film is provided on color filters of the color filter substrate.

A method of manufacturing an optical element of the present invention is a method of manufacturing an optical element having a supporting material, and a phase difference controlling functional layer that is provided on the supporting material and comprises a polymerizable liquid crystal material cured having a predetermined liquid crystal regularity, the method of manufacturing an optical element comprising applying a photosensitive composition as described above onto the supporting material, irradiating with ultraviolet radiation with the polymerizable liquid crystal material aligned in a liquid crystal state, and then carrying out heating treatment so as to crosslink, whereby the phase difference controlling functional layer is formed.

In the method of manufacturing an optical element of the present invention, a transparent substrate having an alignment film thereon may be used as the supporting material.

Moreover, in the method of manufacturing an optical element of the present invention, a color filter substrate having an alignment film thereon may be used as the supporting material, and a protective film may be provided on color filters of the color filter substrate.

By using a compound having at least two alkylol groups therein or a compound having at least two alkoxy groups therein as a crosslinking agent, the state of orientation of the polymerizable liquid crystal material can be strongly maintained. According to the photosensitive composition of the present invention, photo-crosslinking is carried out with the orientation of the polymerizable liquid crystals held as is, and then thermal crosslinking is further carried out, whereby an optical element having a phase difference controlling functional layer having high hardness, excellent ITO resistance, and stable optical properties can be obtained. Moreover, by using a mixture of a compound having at least two alkylol groups therein and a compound having at least two alkoxy groups therein as a crosslinking agent, optimum compatibility can be obtained with various liquid crystal combinations. By making the compatibility be optimum, the state of orientation of the polymerizable liquid crystal material is made stable, and hence the haze of a coating film obtained by applying on and curing the photosensitive composition of the present invention is reduced.

The optical element of the present invention has a phase difference controlling functional layer inside a liquid crystal cell. The number of components in a liquid crystal display is thus reduced, and hence there is an effect of reducing the cost.

In the method of manufacturing an optical element of the present invention, the polymerizable liquid crystal molecules are aligned through prebaking, the alignment is fixed through carrying out photopolymerization as is, and then crosslinking is carried out by heating. As a result, the manufacturing process is simple.

BRIEF DESCRIPTION OF THE DRAWINGS

FIGS. 1A to 1F are sectional process drawings showing an example of a method of manufacturing an optical element of the present invention.

DESCRIPTION OF THE PREFERRED EMBODIMENTS

Following is a detailed description of embodiments of a photosensitive composition for an optical element, an optical element using the photosensitive composition, and a method of manufacturing the optical element, according to the present invention.

<Photosensitive Composition>

The photosensitive composition of the present invention comprises at least a polymerizable liquid crystal material, a photopolymerization initiator, a crosslinking agent, and a solvent, and may further contain a chiral agent, an acid generator, and a surfactant as required. Following is a description of each of the constituent elements.

(Polymerizable Liquid Crystal Material)

In the present invention, a nematic liquid crystal can be used as the polymerizable liquid crystal material; as this material, there may be contained a polymerizable monomer, a polymerizable oligomer, a liquid crystal polymer, or the like alone, or a plurality of such compounds.

Examples of such polymerizable liquid crystal materials are compounds represented by general formula 1 below, and compounds shown in formula 2 below. Two of the compounds represented by formula 1 may be used mixed together. A plurality of the compounds shown in formula 2 may be used mixed together. Moreover, as the polymerizable liquid crystal material, one or a plurality selected from each of the compounds included under formula 1 and the compounds shown in formula 2 may be selected and used mixed together.

Formula 1:

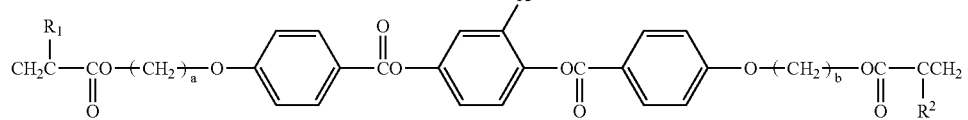

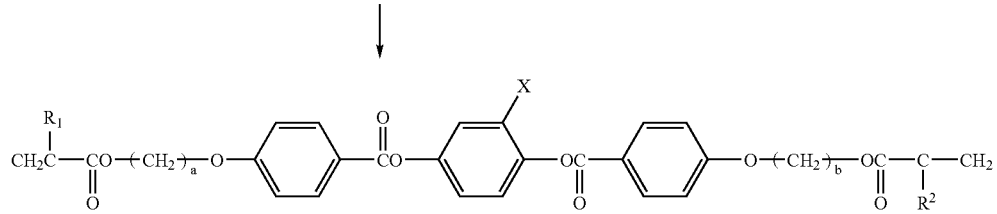

Formula 2:

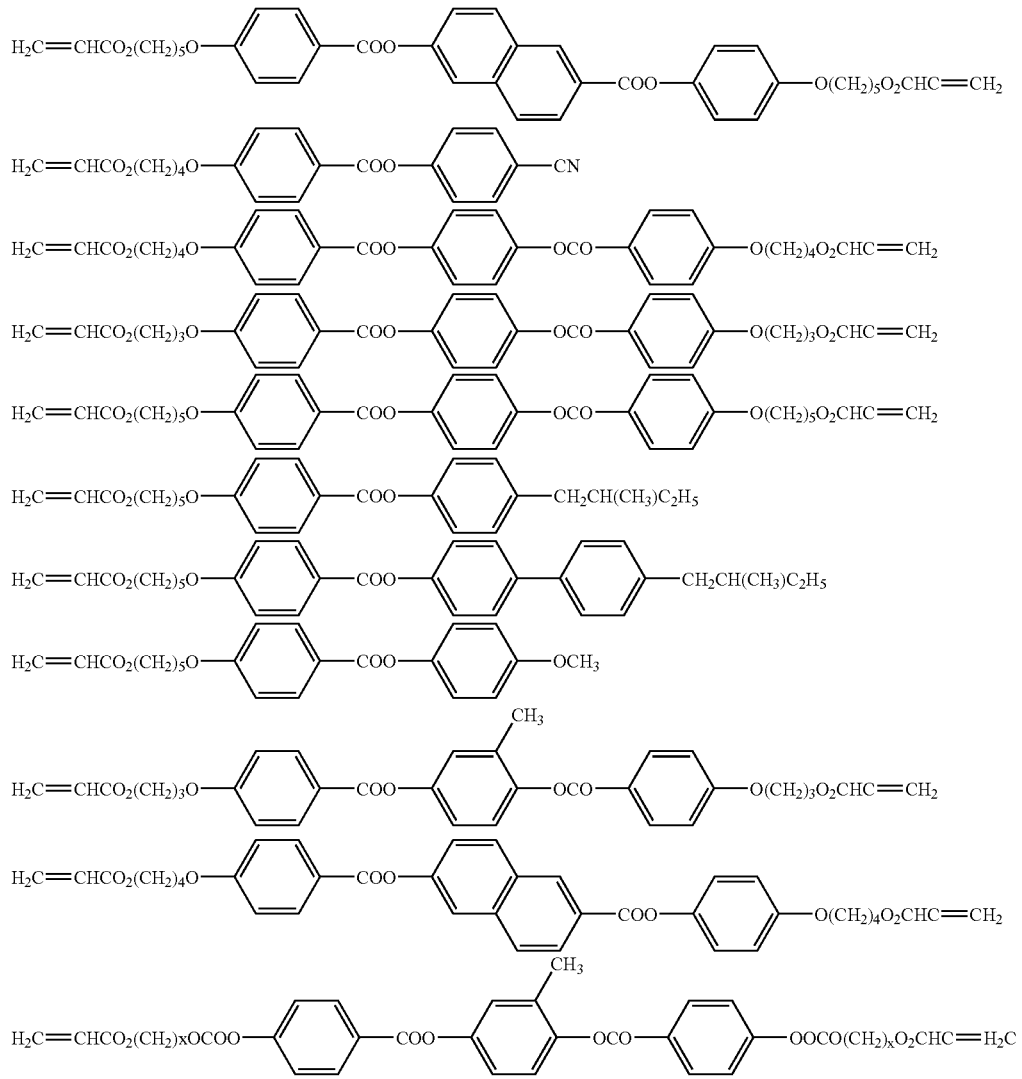

x is an integer of 2 to 5

In a compound represented by general formula 1, $R^1$ and $R^2$ each represents hydrogen or a methyl group, but from the standpoint of the broadness of the temperature range over which the liquid crystalline phase is exhibited, $R^1$ and $R^2$ are preferably both hydrogen. X may be any of hydrogen, chlorine, bromine, iodine, an alkyl group having 1 to 4 carbon atoms, a methoxy group, a cyano group, or a nitro group, but chlorine or a methyl group is preferable. Moreover, a and b, which represent the chain length of the alkylene group acting as a spacer between the aromatic ring and the (meth)acryloyloxy group at each end of the molecular chain of the compound represented by general formula 1, may each take the value of any integer in a range of 2 to 12, but a range of 4 to 10 is preferable, and a range of 6 to 9 is more preferable. A compound for which a=b=0 in formula 1 will have poor stability, and be readily hydrolyzing, and moreover the compound will be highly crystalline. Moreover, a compound having each of a and b greater than 12 in formula 1 will have a low isotropic transition temperature (TI). For these reasons, a compound in which a=b=0 or a and b is each greater than 12 in formula 1 is undesirable, since in each case the temperature range over which liquid crystallinity is exhibited will be narrow.

In the above, the example of a polymerizable liquid crystal monomer is given, but in the present invention a polymerizable liquid crystal oligomer, a polymerizable liquid crystal polymer, or the like may also be used. As such a polymerizable liquid crystal oligomer or polymerizable liquid crystal polymer, one conventionally proposed may be selected and used as appropriate.

Here, the retardation amount and the orientation characteristics are determined by the birefringence Δn of the liquid crystal molecules and the film thickness, and hence Δn is preferably in a range of approximately 0.03 to 0.20, more preferably 0.05 to 0.15.

(Chiral Agent)

In the present invention, a chiral nematic liquid crystal having cholesteric regularity obtained by adding a chiral agent to the nematic liquid crystal can be suitably used. The chiral agent denotes a low molecular weight compound, i.e. a compound having a molecular weight of not more than 1500, having an optically active site. The chiral agent is used mainly with an objective of inducing a spiral pitch to the positive uniaxial nematic regularity exhibited by a compound represented by formula 1. So long as this objective can be achieved, any compound that is compatible with a compound represented by formula 1 or 2 in a solution state or in a molten state, does not harm the liquid crystallinity of the polymerizable liquid crystal material exhibiting nematic regularity as described above, and can induce the desired spiral pitch thereto can be used as the chiral agent, there being no particular limitation to the type of low molecular weight compound described below; nevertheless, to obtain an optical element having good heat resistance, it is preferable for there to be a polymerizable functional group at each end of the molecule.

It is essential that the chiral agent used for inducing the spiral pitch in the liquid crystal has at least some kind of chirality in the molecule thereof. Accordingly, examples of chiral agents that can be used in the present invention are, for example, compounds having therein one asymmetric carbon or a plurality of asymmetric carbons, compounds having an asymmetric site at a hetero atom such as chiral amines and chiral sulfoxides, and compounds having axial asymmetry such as cumulenes and binaphthols. A more specific example is a commercially available chiral nematic liquid crystal such as S-811 made by Merck.

However, depending upon the nature of the chiral agent selected, it may be that the nematic regularity produced by a compound represented by formula 1 is destroyed or the orientation decreases, or in the case that the compound is non-polymerizable, the curability of the liquid crystalline composition decreases, bringing about a decrease in the reliability of the cured film. Furthermore, using a large amount of an optically active site-possessing chiral agent results in an increase in the cost of the composition. Accordingly, in the case of manufacturing a circular polarization controlling optical element having short pitch cholesteric regularity, as the optically active site-possessing chiral agent included in the liquid crystalline composition of the present invention, it is preferable to select a chiral agent having a large effect of inducing spiral pitch, specifically it is preferable to use a low molecular weight compound having axial asymmetry in the molecule thereof such as one of the compounds (1) to (3) represented by undermentioned formula 3.

Formula 3:

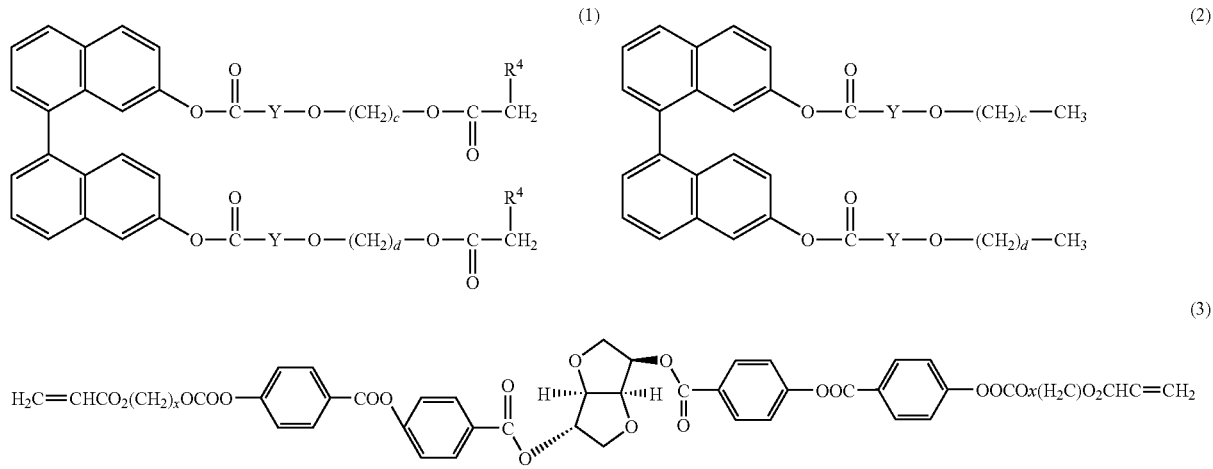

In compounds (1) and (2) shown in formula 3, $R^4$ represents hydrogen or a methyl group, and Y is any one of (i) to (xxiv) shown in formulae 4 and 5, preferably any one of (i), (ii), (iii), (v) and (vii).

Formula 4:

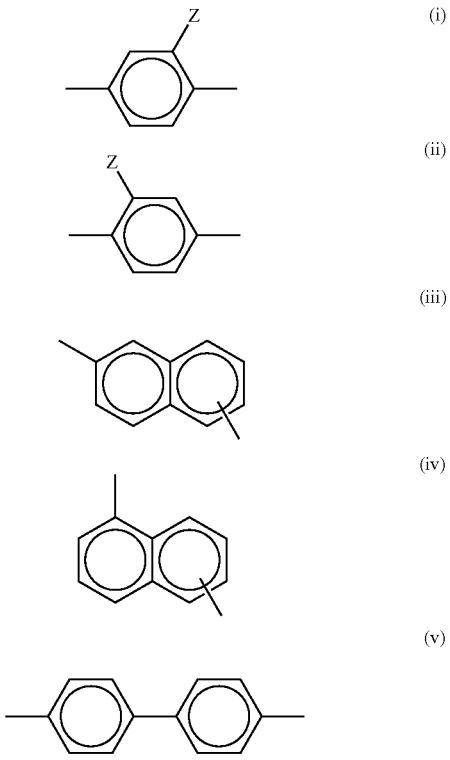

-continued (vi) 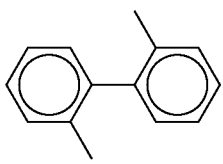

(vii) 

(viii) 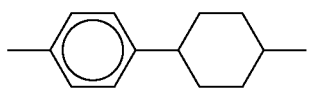

(ix) 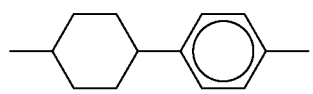

(x) 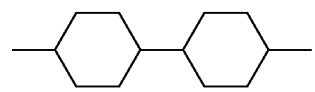

(xi) 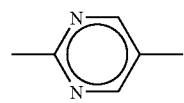

(xii) 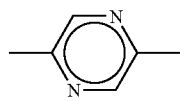

(xiii) 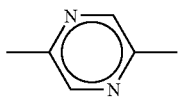

(xiv) 

(xv) 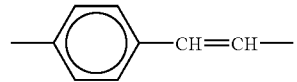

(xvi) 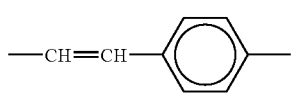

(xvii) 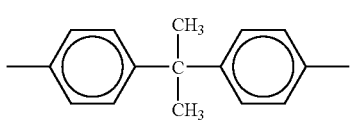

-continued

Formula 5:

(xviii)

(xix)

(xx)

(xxi)

(xxii)

(xxiii)

(xxiv)

In compounds (1) and (2) shown in formula 3, c and d, which represent the chain length of an alkylene group, may each take the value of any integer in a range of 2 to 12, but a range of 4 to 10 is preferable, and a range of 6 to 9 is more preferable. In compounds (1) and (2) of formula 3, in the case that the value of c or d is 0 or 1, there will be a lack of stability, hydrolysis readily occurring, and the crystallinity will also be high. On the other hand, a compound (1) or (2) having the value of c or d greater than 12 will have a low melting point (Tm). For such a compound, the compatibility with a liquid crystalline compound represented by formula 1 or 2 may be decreased, and hence depending on the concentration, phase separation or the like may occur.

Regarding the amount of the chiral agent included in the polymerizable liquid crystal material in the present invention, the optimum value is determined considering the spiral pitch inducing ability and the cholesteric property of the polarization selecting reflective layer finally obtained. Specifically, although greatly differing depending on the polymerizable liquid crystal material used, the amount of the chiral agent is generally selected from a range of 0.01 to 60 wt %, preferably 0.1 to 40 wt %, more preferably 0.5 to 30 wt %, most preferably 1 to 20 wt %, per 100 wt % of the polymerizable liquid crystal material. In the case that this amount is less than such a range, it may not be possible to give the polymerizable liquid crystal material a sufficient cholesteric property, whereas in the case that this amount exceeds such a range, molecular orientation may be hampered, and there will be a risk of having adverse effects when curing with active radiation.

In the present invention, it is not essential that the chiral agent be polymerizable in particular. Nevertheless, considering the thermal stability and so on of the phase difference controlling functional layer obtained, it is preferable to use a polymerizable chiral agent capable of polymerizing with the polymerizable liquid crystal material so as to fix the cholesteric regularity. In particular, to obtain an optical element having good heat resistance, it is preferable to have a polymerizable functional group at each end of the molecule.

(Photopolymerization Initiator)

When forming the polymerizable liquid crystal layer, a photopolymerization initiator must be added, this being within a range such as not to greatly harm the orientation of the liquid crystal in the polymerizable liquid crystal material. A radical polymerization initiator may be used as the photopolymerization initiator. Such a radical polymerization initiator is a compound that generates free radicals upon being subjected to energy such as ultraviolet radiation. Examples include benzophenone derivatives such as benzophenone and benzoin, and derivatives such as esters thereof; xanthone and thioxanthone derivatives; halogen-containing compounds such as chlorosulfonyl and chloromethyl polynuclear aromatic compounds, chloromethyl heterocyclic compounds, and chloromethylbenzophenones; triazines; fluorenones; haloalkanes; redox coupling agents between a photoreducible pigment and a reducing agent; organic sulfur compounds; and peroxides. Preferable examples include ketone and bimidazole compounds such as Irgacure 184, Irgacure 369, Irgacure 651 and Irgacure 907 (all made by Ciba Specialty Chemicals), Darocure (made by Merck), Adeka 1717 (made by Adeka Corporation), and 2,2'-bis(o-chlorophenyl)-4'4,5,4', 5'-tetraphenyl-1,2'-biimidazole (made by Kurogane Kasei Co., Ltd.). One of these initiators only may be used, or a plurality may be used in combination. In the case of using a plurality in combination, it is preferable to make it such that the absorption spectroscopic properties are not hampered. Note also that a sensitizer other than a photopolymerization initiator may also be added within a range such that the object of the present invention is not harmed.

Regarding the amount added of the polymerization initiator, the polymerization initiator is generally added to the polymerizable liquid crystal material in a range of 0.01 to 15 wt %, preferably 0.1 to 12 wt %, more preferably 0.5 to 10 wt %, per 100 wt % of the polymerizable liquid crystal material.

(Crosslinking Agent)

Examples of a compound having at least two alkylol groups therein used as a crosslinking agent in the present invention are alcohols that undergo electrophilic substitution onto an aromatic ring. Specific examples include polyfunctional alkanol aromatic compounds such as 1,2-benzenedimethanol, 1,3-benzenedimethanol, 1,4-benzenedimethanol and 1,3,5-benzenetrimethanol, polyfunctional alkanol ureas such as dimethylol urea, dimethylol ethylene urea and dimethylol propylene urea, polyfunctional alkyl alkanol compounds such as trimethylolpropane and trimethylolpropane monoallyl ether, polyfunctional alkanol melamine compounds such as trimethylol melamine, triethylol melamine, hexamethylol melamine and hexaethylol melamine, and alkanol benzoguanamine compounds such as dimethylol benzoguanamine, trimethylol benzoguanamine and tetramethylol benzoguanamine.

Moreover, examples of a compound having at least two alkoxy groups therein are alkoxy compounds that undergo electrophilic substitution onto an aromatic ring. Specific examples include 1,4-dimethoxymethylbenzene, 1,3,5-trimethoxymethylbenzene, 1,3,5-triazine-2,4,6,-tri (dimethoxymethylamine), 1,3,5-triazine-2-methoxymethylamine-4,6-di(dimethoxymethylamine), 1,4-bis (methoxyphenoxy)benzene, trimethoxymethyl melamine, hexamethoxymethyl melamine, N,N'-dimethoxymethyl urea, and N,N'-dimethoxymethyl-4,5-dimethoxy-2-imidazolidione.

One of such a compound having at least two alkylol groups therein and such a compound having at least two alkoxy groups therein may be used as the crosslinking agent, but if both are used mixed together, then optimum compatibility can be obtained with various liquid crystal combinations.

The crosslinking agent is generally added to the polymerizable liquid crystal material in a range of 1 to 50 wt %, preferably 5 to 30 wt %, per 100 wt % of the polymerizable liquid crystal material.

(Acid Generator)

In a preferable embodiment of the present invention, an acid generator is included as a catalyst. There are no particular limitations on the acid generator so long as the acid generator generates an acid either directly or indirectly upon being subjected to light or heat. Examples include various onium salt compounds such as aromatic diazonium salts, diaryl iodonium salts, triaryl sulfonium salts, and triaryl selenium salts, and also sulfonic acid esters, and halogen compounds.

As specific examples, examples of aromatic diazonium salts include chlorobenzene diazonium hexafluorophosphate, dimethylaminobenzene diazonium hexafluoroantimonate, naphthyl diazonium hexafluorophosphate, and dimethylaminonaphthyl diazonium tetrafluoroborate.

Examples of diaryl iodonium salts include diphenyliodonium tetrafluoroborate, diphenyliodonium hexafluoroantimonate, diphenyliodonium hexafluorophosphate, diphenyliodonium triflate, 4,4'-di-t-butyl-diphenyliodonium triflate, 4,4'-di-t-butyl-diphenyliodonium tetrafluoroborate, and 4,4'-di-t-butyl-diphenyliodonium hexafluorophosphate.

Examples of triaryl sulfonium salts include triphenylsulfonium tetrafluoroborate, triphenylsulfonium hexafluorophosphate, triphenylsulfonium hexafluoroantimonate, tri(p-chlorophenyl)sulfonium tetrafluoroborate, tri(p-chlorophenyl)sulfonium hexafluorophosphate, tri(p-chlorophenyl)sulfonium hexafluoroantimonate, and 4-t-butyltriphenylsulfonium hexafluorophosphate.

Examples of triaryl selenium salts include triaryl selenium tetrafluoroborates, triaryl selenium hexafluorophosphates, triaryl selenium hexafluoroantimonates, di(chlorophenyl) phenyl selenium tetrafluoroborate, di(chlorophenyl)phenyl selenium hexafluorophosphate, and di(chlorophenyl)phenyl selenium hexafluoroantimonate.

Examples of sulfonic acid esters include benzoin tosylate, p-nitrobenzyl-9,10-ethoxyanthracene-2-sulfonate, 2-nitrobenzyl tosylate, 2,6-dinitrobenzyl tosylate, and 2,4-dinitrobenzyl tosylate.

Examples of halogen compounds include 2-chloro-2-phenylacetophenone, 2,2',4'-trichloroacetophenone, 2,4,6-tris (trichloromethyl)-s-triazine, 2-(p-methoxystyryl)-4,6-bis (chloromethyl)-s-triazine, 2-phenyl-4,6-bis (trichloromethyl)-s-triazine, 2-(p-methoxyphenyl)-4,6-bis (trichloromethyl)-s-triazine, 2-(4'-methoxy-1'-naphthyl)-4, 6-bis(trichloromethyl)-s-triazine, bis-2-(4-chlorophenyl)-1, 1,1-trichloroethane, bis-1-(4-chlorophenyl)-2,2,2-trichloroethanol, and bis-2-(4-methoxyphenyl)-1,1,1-trichloroethane.

Such an acid generator is generally added to the polymerizable liquid crystal material in a range of 0.1 to 20 wt %, preferably 1 to 10 wt %, per 100 wt % of the polymerizable liquid crystal material.

(Surfactant)

When forming the polymerizable liquid crystal layer by applying on the photosensitive composition, to improve the application properties of the photosensitive composition solution, a surfactant is preferably as added as appropriate within a range such as not to greatly harm the orientation of the liquid crystals. As the surfactant, there can be used a nonionic surfactant such as a polyoxyethylene alkyl ether, a polyoxyethylene alkyl aryl ether, a polyoxyethylene derivative, a polyoxyethylene-polyoxypropylene block copolymer, a polyoxyethylene-sorbitan fatty acid ester, a polyoxyethylene-sorbitol fatty acid ester, a polyoxyethylene fatty acid ester, or a polyoxyethylene alkylamine, or an anionic surfactant such as a fatty acid salt, an alkylsulfuric acid ester salt, an alkylbenzene sulfonic acid salt, an alkylnaphthalene sulfonic acid salt, an alkylsulfosuccinic acid salt, an alkyl diphenyl ether disulfonic acid salt, an alkylphosphoric acid salt, a polyoxyethylene alkylsulfuric acid ester salt, a naphthalenesulfonic acid-formalin condensation product, a special polycarboxylic acid type polymeric surfactant, or a polyoxyethylene alkylphosphoric acid ester.

Such a surfactant is generally added to the polymerizable liquid crystal material in a range of 0.01 to 1 wt %, preferably 0.05 to 0.5 wt %, per 100 wt % of the polymerizable liquid crystal material.

(Solvent)

The polymerizable liquid crystal material and the other constituent elements described above are dissolved in any of various organic solvents to form a solution, which can then be applied onto a predetermined supporting material. There are no particular limitations on the solvent used in the solution of the photosensitive composition, so long as this is a solvent that is capable of dissolving the polymerizable composition containing the polymerizable liquid crystal material, and does not hamper alignment ability on a substrate having an orientable material provided thereon.

Specifically, one or a plurality selected from hydrocarbons such as benzene, toluene, xylene, n-butylbenzene, diethylbenzene and tetralin, ethers such as methoxybenzene, 1,2-dimethoxybenzene and diethylene glycol dimethyl ether, ketones such as acetone, methyl ethyl ketone, methyl isobutyl ketone, cyclohexanone and 2,4-pentanedione, esters such as ethyl acetate, ethylene glycol monomethyl ether acetate, propylene glycol monomethyl ether acetate, propylene glycol monoethyl ether acetate and γ-butyrolactone, amide type solvents such as 2-pyrrolidone, N-methyl-2-pyrrolidone, dimethylformamide and dimethylacetamide, halogenated solvents such as chloroform, dichloromethane, carbon tetrachloride, dichloroethane, tetrachloroethane, trichloroethylene, tetrachloroethylene, chlorobenzene and o-dichlorobenzene, alcohols such as t-butanol, diacetone alcohol, glycerol, monoacetin, ethylene glycol, triethylene glycol, hexylene glycol, ethylene glycol monomethyl ether, ethyl cellosolve and butyl cellosolve, phenols such as phenol and p-chlorophenol, and so on can be used.

If only one solvent is used, then the solubility of the polymerizable liquid crystal composition may be insufficient, or a substrate having alignment ability as described above may be corroded. However, by using a mixture of a plurality of solvents, such problems can be avoided. Among the above solvents, ones preferable as solvents used alone are hydrocarbon solvents and glycol monoether acetate solvents; ones preferable as mixed solvents are mixtures of an ether or a ketone and a glycol. The solvent concentration varies depending on the solubility of the liquid crystalline composition, the desired thickness of the optically functional layer, and so on, but is generally in a range of 1 to 60 wt %, preferably 3 to 40 wt %.

<Optical Element>

The optical element of the present invention is an optical element having a supporting material, and a phase difference controlling functional layer that is provided on the supporting material and comprises a polymerizable liquid crystal material cured having a predetermined liquid crystal regularity, wherein the phase difference controlling functional layer is formed using the photosensitive composition described above. Furthermore, the polymerizable liquid crystal material constituting the phase difference controlling functional layer is crosslinked between terminal groups and between mesogenic backbones.

(Supporting Material)

As the supporting material in the optical element of the present invention, a substrate in which an alignment film is formed on a transparent substrate, or a color filter substrate in which an alignment film is formed on a color filter layer, or a color filter substrate in which a protective film is provided on a color filter layer and an alignment film is formed on the protective film can be used.

(Alignment Film Material)

For the alignment film provided on the supporting material, a polyimide or the like that is a conventionally publicly known alignment film material can be used; a layer of the alignment film material is formed on the substrate, and then rubbing treatment or alignment treatment with light is carried out to obtain the alignment film. Alternatively, the alignment film may be obtained through oblique vapor deposition of silicon oxide on the substrate. As the alignment film material used in the present invention, a commercially available alignment film material can be used. Specifically, an alignment film material made by Nissan Chemical Industries Ltd. (Sunever), an alignment film material made by HD MicroSystems Ltd. (QL, LX series), an alignment film material made by JSR (AL series), an alignment agent made by Chisso Corporation (Lixon Aligner), or the like can be used.

(Phase Difference Controlling Functional Layer)

The phase difference controlling functional layer in the optical element of the present invention is formed using the above photosensitive composition, and is such that the polymerizable liquid crystal material which is polymerized with the liquid crystal molecules aligned in a fixed direction forms a three-dimensional structure through the mesogenic backboness of the liquid crystal molecules being crosslinked together by the crosslinking agent, whereby the heat resistance and the properties upon ITO film formation are improved.

In the present invention, there are no particular limitations on the thickness of the phase difference controlling functional layer, but considering productivity and so on, this is generally preferably approximately in a range of 0.5 to 10 μm.

(Measurement)

The birefringence of the optical element of the present invention can be measured by measuring the retardation and the thickness. The retardation can be measured using a commercially available apparatus such as a Kobra-21 series apparatus (made by Oji Scientific Instruments); the measurement wavelength is preferably in the visible range (380 to 780 nm), the measurement preferably being carried out around 550 nm, which is where the relative luminous efficiency is greatest.

Moreover, the thickness can be measured using a commercially available apparatus such as a stylus type profilometer such as Dektak (Sloan).

Furthermore, the surface hardness of the coating film can be measured using a commercially available apparatus such as an ultra-small hardness meter such as a Fischerscope.

<Method of Manufacturing Optical Element>

FIGS. 1A to 1F are sectional process drawings showing an example of a method of manufacturing an optical element of the present invention, showing a method of manufacturing an optical element in which a phase difference controlling functional layer is formed on a transparent substrate on which an alignment film has been provided. Following is a description of the method of manufacturing the optical element of the present invention with reference to the drawings.

A transparent substrate 1 is prepared (FIG. 1A). A glass substrate or heat-resistant transparent resin substrate conventionally used for color filters can be used as the transparent substrate 1. Next, an alignment film material such as a polyimide is applied onto the transparent substrate 1, and rubbing treatment is carried out, so as to obtain a supporting material 3 having provided thereon an alignment film 2 that has been given alignment ability (FIG. 1B).

Next, a photosensitive composition containing at least a polymerizable liquid crystal material 4, a photopolymerization initiator, a crosslinking agent 5, and a solvent is applied onto the alignment film 2, thus forming a coating film (FIG. 1C). Examples of the method of applying on the photosensitive composition include a spin coating method, a roll coating method, a slide coating method, a printing method, and a die coating method.

Next, the substrate on which the coating film has been formed is prebaked to remove solvent. At this time, the fluidity due to the heating in the prebaking is used so as to align the polymerizable liquid crystal molecules 4 in a fixed direction (FIG. 1D). The prebaking temperature and time depend on the characteristics of the materials contained in the photosensitive composition and thus cannot be stated unconditionally, but the prebaking is generally carried out in a range of approximately a few minutes to 30 minutes at 70 to 120° C.

Next, with the polymerizable liquid crystal molecules 4 aligned in the fixed direction, exposure to ultraviolet radiation 6 is carried out, thus crosslinking the terminal groups of the polymerizable liquid crystal molecules 4 together and hence curing (FIG. 1E). The ultraviolet radiation 6 may be radiation of wavelength approximately 300 to 500 nm, it being possible to use a high pressure mercury lamp, a xenon lamp, a metal halide lamp, or the like. The radiation dose varies according to the type and composition of the polymerizable liquid crystal material 4, the type and amount of the photopolymerization initiator, and so on, but is generally in a range of approximately 10 to 3000 mJ/cm$^2$.

Next, heating treatment is carried out, thus crosslinking mesogenic groups of the polymerized polymerizable liquid crystal molecules 4 together via crosslinking sites 8 through the crosslinking agent, so as to obtain a polymerizable liquid crystal material having a three-dimensional structure in which the polymerizable liquid crystal molecules are aligned in the fixed direction, whereby a phase difference controlling functional layer 9 is formed, so that an optical element 10 having the phase difference controlling functional layer 9 on the supporting material 3 is formed (FIG. 1F). The heating temperature and time depend on the type and composition of the polymerizable liquid crystal material 4, the reaction onset temperature of the crosslinking agent 5, and so on, but the heating is generally carried out in a range of approximately 10 to 60 minutes at 150 to 260° C.

The optical element 10 can further be provided with a color filter layer having a black matrix layer thereon, thus obtaining a liquid crystal display having the optical element provided inside a liquid crystal cell.

In the above embodiment of the manufacturing method, description was given for the case that the phase difference controlling functional layer is provided on a transparent substrate having an alignment film thereon as the supporting material, but the method of manufacturing an optical element of the present invention can also be similarly used in the case that the supporting material is a color filter substrate having an alignment film thereon, or the case that a protective film is further provided on the color filters of such a color filter substrate.

Next, the present invention will be described in more detail through examples.

Example 1

An AL1254 alignment film made by JSR was applied using a spin coater onto a 100×100 mm glass substrate to a thickness of 0.065 μm, and baking was carried out for 1 hour in an oven at 230° C. Alignment treatment was then carried out on the substrate using a rubbing apparatus.

Next, a photosensitive composition comprising RMM34 (made by Merck; 21.25 wt %) as a polymerizable liquid crystal exhibiting a nematic liquid crystalline phase, Irgacure 907 (made by Ciba Specialty Chemicals; 1.25 wt %) as a photopolymerization initiator, 1,4-benzenedimethanol (made by Kanto Chemical, Co. Inc.; 2.5 wt %) as a crosslinking agent, MP-triazine (made by Sanwa Chemical Co., Ltd.; 2.5 wt %) as an acid generator, and diethylene glycol dimethyl ether (75 wt %) was prepared as a polymerizable liquid crystal solution. The alignment film-possessing glass substrate was then set in a spin coater, and the liquid crystal solution was spin-coated on such that the thickness after baking would be approximately 1.5 μm.

Next, alignment treatment was carried out by heating for 3 minutes at 80° C., whereupon a liquid crystal transition point from a cloudy state to a transparent state was visually observed. The liquid crystal layer was then irradiated as is for 5 seconds with ultraviolet radiation at 20 mW/cm$^2$ using an ultraviolet radiation irradiating apparatus having an extra-high pressure mercury lamp, so as to form a polymerized liquid crystal layer, and then baking was carried out for 60 minutes using an oven at 230° C., whereby a cured film was formed as a phase difference controlling functional layer. The universal hardness of the cured film obtained was calculated to be approximately 300 N/mm$^2$ using a Fischerscope H-100 made by Fischer Instruments provided with a Vickers indenter from the indentation amount upon applying a load up to 1.5 mN at 37.5 μN/s in the thickness direction at room temperature and holding for 5 seconds.

Furthermore, the obtained cured film was subjected to 14 minutes of ITO sputtering using a sputtering apparatus (SV9540) made by Ulvac Inc. at 200° C., a pressure of 6.0× 10$^{-13}$ Torr, an argon gas flow rate of 78.0 sccm, an oxygen gas flow rate of 0.9 sccm, and an applied voltage of 5 kW, thus forming an ITO film of thickness 1400 Å and surface resistance of 30Ω on the cured film. Cracking did not occur in the ITO film obtained, the surface quality being good.

Example 2

In the present example, a liquid crystal layer was formed as in Example 1, except that dimethylol urea (made by Showa Chemical; 2.5 wt %) was used as the crosslinking agent. The surface hardness of the coating film obtained was 290 N/mm$^2$. Moreover, upon ITO film formation, cracking did not occur in the ITO film obtained, the surface quality being good.

Example 3

A liquid crystal layer was formed as in Example 1, except that Nicalac MW-30HM (made by Sanwa Chemical Co., Ltd.; 2.5 wt %) was used as the crosslinking agent. The surface hardness of the coating film obtained was approximately 310 N/mm$^2$. Moreover, upon ITO film formation, cracking did not occur in the ITO film obtained, the surface quality being good.

Example 4

A liquid crystal layer was formed as in Example 1, except that Nicalac MX-280 (made by Sanwa Chemical Co., Ltd.; 2.5 wt %) was used as the crosslinking agent. The surface hardness of the coating film obtained was 280 N/mm$^2$. Moreover, upon ITO film formation, cracking did not occur in the ITO film obtained, the surface quality being good.

Example 5

A liquid crystal layer was formed as in Example 1, except that 1,4-benzenedimethanol (made by Kanto Chemical, Co. Inc.; 1.0 wt %) and Nicalac MW-30HM (made by Sanwa Chemical Co., Ltd.; 1.5 wt %) were used as crosslinking agents. The surface hardness of the coating film obtained was approximately 300 N/mm$^2$. Moreover, upon ITO film formation, cracking did not occur in the ITO film obtained, the surface quality being good.

Example 6

A liquid crystal layer was formed as in Example 1, except that 1,4-benzenedimethanol (made by Kanto Chemical, Co. Inc.; 1.0 wt %) and Nicalac MX-280 (made by Sanwa Chemical Co., Ltd.; 1.5 wt %) were used as crosslinking agents. The surface hardness of the coating film obtained was 290 N/mm$^2$. Moreover, upon ITO film formation, cracking did not occur in the ITO film obtained, the surface quality being good.

Comparative Example 1

A liquid crystal layer was formed as in Example 1, except that a crosslinking agent was not used. The surface hardness of the coating film obtained was 200 N/mm$^2$, and upon ITO film formation, cracking occurred in the ITO film obtained, the coating film being cloudy.

What is claimed is:
1. An optical element, comprising a supporting material, and a phase difference controlling functional layer provided on said supporting material and including a polymerized liquid crystal material cured to have a predetermined liquid crystal regularity, wherein said phase difference controlling functional layer is formed by curing a photosensitive composition, said photosensitive composition comprising at least a polymerizable liquid crystal material, a photopolymerization initiator, a crosslinking agent, an acid generator, and a solvent, and
wherein said crosslinking agent is selected from the group consisting of alcohols having at least two alkylol groups therein and undergoing electrophilic substitution onto an aromatic ring, and alkoxy compounds having at least two alkoxy groups therein and undergoing electrophilic substitution onto an aromatic ring.

2. The optical element according to claim 1, wherein said polymerized liquid crystal material is crosslinked between mesogenic backbones via said crosslinking agent and between terminal groups.

3. The optical element according to claim 1, wherein said supporting material is a transparent substrate having an alignment film thereon.

4. The optical element according to claim 1, wherein said supporting material is a color filter substrate having an alignment film thereon.

5. The optical element according to claim 4, wherein a protective film is provided on color filters of said color filter substrate.

6. The optical element according to claim 1, wherein the photosensitive composition contains the crosslinking agent in a range of 1 to 50 wt % per 100 wt % of the polymerizable liquid crystal material.

7. The optical element according to claim 1, wherein the photosensitive composition contains the acid generator in a range of 0.1 to 20 wt % per 100 wt % of the polymerizable liquid crystal material.

8. The optical element according to claim 1, wherein the phase difference controlling functional layer has a three-dimensional structure.

9. An optical element, comprising a supporting material, and a phase difference controlling functional layer provided on said supporting material and including a polymerized liquid crystal material cured to have a predetermined liquid crystal regularity, wherein said phase difference controlling functional layer is formed by curing a photosensitive composition, said photosensitive composition comprising at least a polymerizable liquid crystal material, a photopolymerization initiator, a crosslinking agent, and a solvent, and wherein said crosslinking agent comprises a mixture of a compound having at least two alkylol groups therein and a compound having at least two alkoxy groups therein.

10. The optical element according to claim 9, wherein said polymerized liquid crystal material is crosslinked between mesogenic backbones via said crosslinking agent and between terminal groups.

11. The optical element according to claim 9, wherein said supporting material is a transparent substrate having an alignment film thereon.

12. The optical element according to claim 9, wherein said supporting material is a color filter substrate having an alignment film thereon.

13. The optical element according to claim 12, wherein a protective film is provided on color filters of said color filter substrate.

14. An optical element, comprising a supporting material, and a phase difference controlling functional layer provided on said supporting material and including a polymerized liquid crystal material cured to have a predetermined liquid crystal regularity, wherein said phase difference controlling functional layer is formed by curing a photosensitive composition, said photosensitive composition comprising at least a polymerizable liquid crystal material, a photopolymerization initiator, a crosslinking agent, an acid generator, and a solvent, wherein said crosslinking agent is selected from the group consisting of alcohols having at least two alkylol groups therein and undergoing electrophilic substitution onto an aromatic ring, and alkoxy compounds having at least two alkoxy groups therein and undergoing electrophilic substitution onto an aromatic ring, and wherein the polymerizable liquid crystal molecules in said polymerized liquid crystal material are crosslinked between terminal groups thereof and mesogenic groups of the polymerized polymerizable liquid crystal molecules are crosslinked via crosslinking sites.

15. The optical element according to claim 14, wherein the photosensitive composition contains the acid generator in a range of 1 to 50 wt % per 100 wt % of the polymerizable liquid crystal material.

16. The optical element according to claim 14, wherein the photosensitive composition contains the acid generator in a range of 0.1 to 20 wt % per 100 wt % of the polymerizable liquid crystal material.

17. The optical element according to claim 14, wherein the phase difference controlling functional layer has a three-dimensional structure.

18. An optical element, comprising a supporting material, and a phase difference controlling functional layer provided on said supporting material and including a polymerized liquid crystal material cured to have a predetermined liquid crystal regularity, wherein said phase difference controlling functional layer is formed by curing a photosensitive composition, said photosensitive composition comprising at least a polymerizable liquid crystal material, a photopolymerization initiator, a crosslinking agent, and a solvent, wherein said crosslinking agent comprises a mixture of a compound having at least two alkylol groups therein and a compound having at least two alkoxy groups therein, and wherein the photosensitive composition further contains an acid generator.

* * * * *